Patented July 6, 1943

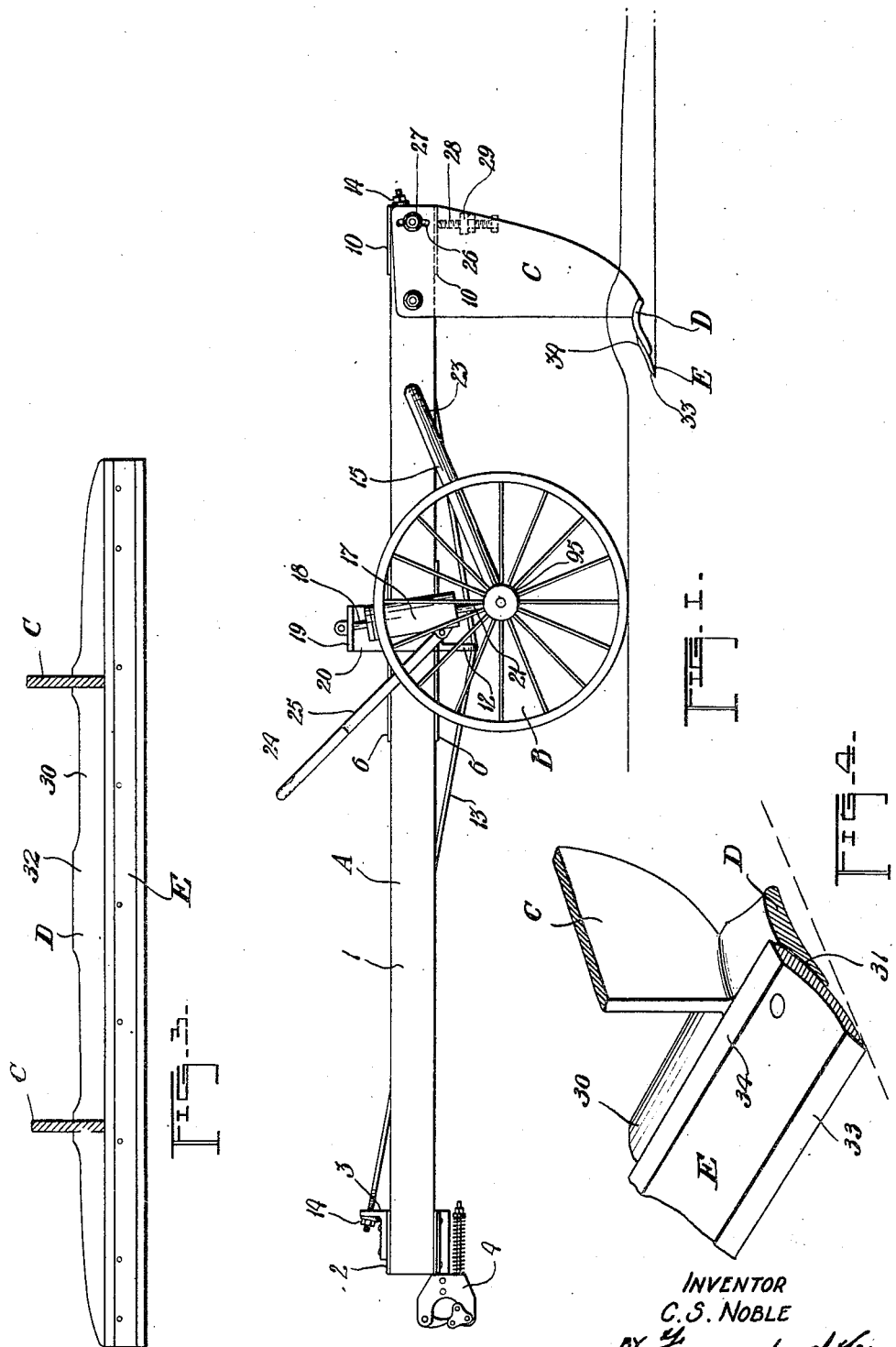

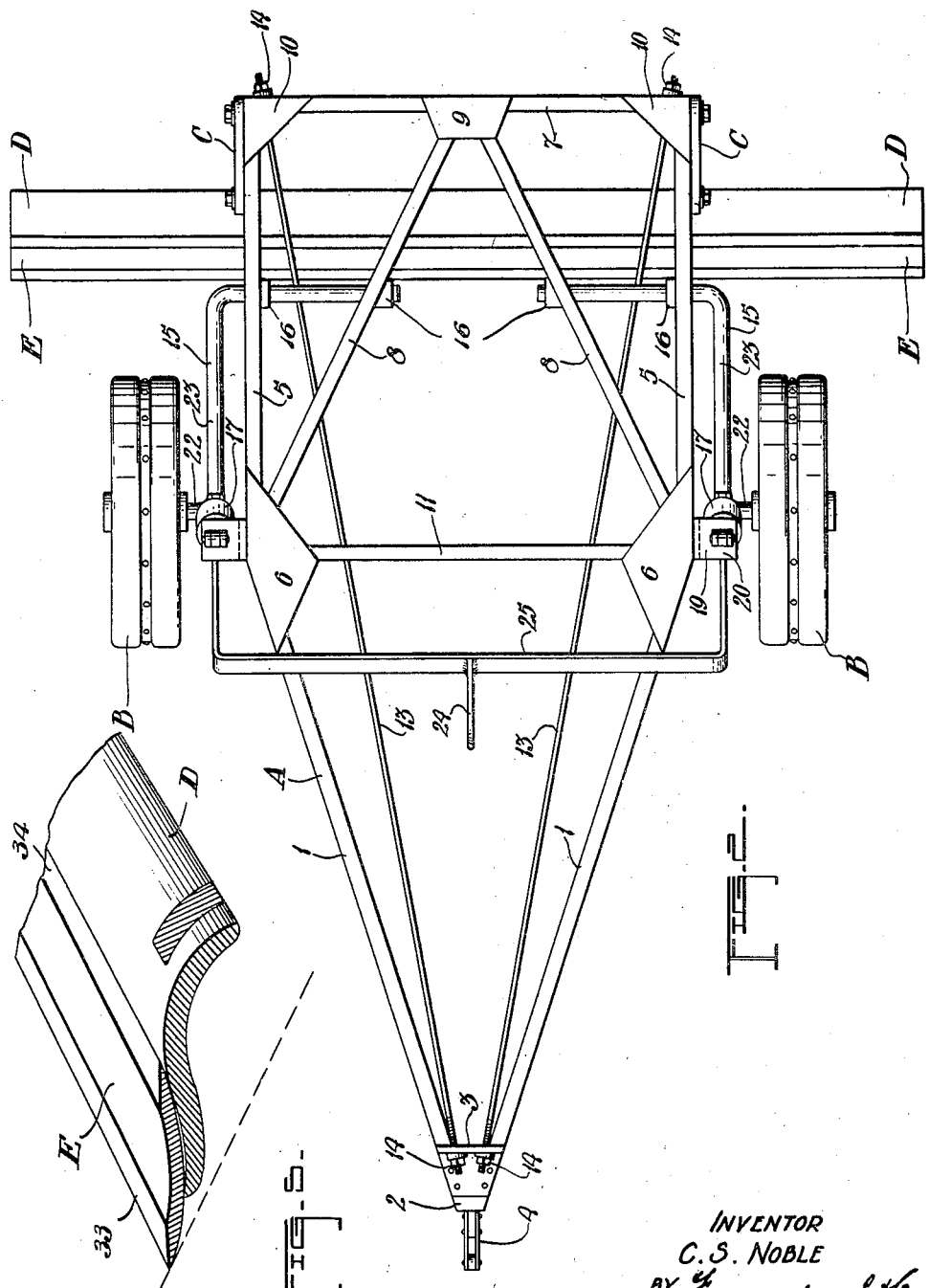

2,323,412

UNITED STATES PATENT OFFICE 2,323,412

COVER CULTIVATOR

Charles Sherwood Noble, Nobleford, Alberta, Canada

Application May 12, 1938, Serial No. 207,603
In Canada June 21, 1937

5 Claims. (Cl. 97—144.1)

My invention relates to improvements in cultivators for dry-land farming, a principal object of this invention being to provide means whereby land where moisture is scarce may be treated for the eradication of weeds without the necessity of removing stubble upon the surface thereof, thereby permitting the maintenance of a trash covering upon the surface of such land, the said trash being valuable for holding and preventing the evaporation of moisture.

A further object of my invention is to provide a device of the character herewithin described by the use of which losses from drifting soil may be reduced, thereby increasing yields.

A further object of my invention is to provide a device of the character herewithin described designed to accomplish the first as well as all subsequent work of preparing a fallow.

A further object of my invention is to provide a device of the character herewithin described which is designed to penetrate any land which a plow can penetrate, being also designed to eliminate the use of a plow or any other cultivating instrument.

A further object of my invention is to provide a device of the character herewithin described comprising essentially a wheeled framework designed to travel over the surface of the ground, a pair of standards of a design hereinafter to be described, a cultivating blade carrier, and a cultivating blade, the said blade being designed to effect a soil crushing action and in combination with the blade carrier to open up a "furrow slice," below ground level at any desired breadth and parallel with the surface of the ground, the said slice being conducted over the blade and the carrier in an easy, polishing flow upwardly with a minimum of draft but in such a way as to effect the best possible weed kill.

A further object of my invention is to provide a device of the character herewithin described which will tend to iron out any unevenness caused by the careless use of other implements and in which no moist soil is brought to the surface to dry out.

A further object of my invention is to provide a device of the character herewithin described utilizing a double edged reversible cultivating blade bevelled either upon the upper surfaces or the lower surfaces thereof.

A further object of my invention is to provide a device of the character herewithin described in which a double edged reversible cultivating blade of comparatively thin cross-section is employed, the same being stiffened by an elongated stiffener bolted to the under-side thereof.

A further object of my invention is to provide a device of the character herewithin described in which no pulverizing of the surface of the land takes place, but which in spite of this, will eradicate and sever all weed growth after which the said weed growth will decompose upon the surface of the land far more rapidly than is the case when such weed growth is plowed under.

A further object of my invention is to provide a device of the character herewithin described the use of which when used for fall cultivation will prevent weeds from drawing further moisture and producing seed, the said weeds being instead decomposed to afford a certain mulching and fertilizing value.

A further object of my invention is to provide a device of the character herewithin described by the use of which the stubble is not broken down as with other implements but left erect to gather snow, the furrow at the roots of the stubble being however loosened to absorb better any fall, winter or early spring moisture.

With the above more important objects in view and such other minor objects as may appear as the specification proceeds, my invention consists essentially in the arrangement and construction of parts all as hereinafter more particularly described, reference being had to the accompanying drawings, in which—

Fig. 1 is a side view of my cover cultivator.

Fig. 2 is a plan view of Figure 1.

Fig. 3 is a plan illustrating particularly the configuration of the rear edge of my blade carrier.

Fig. 4 is a perspective detail illustrating a portion of my concave cultivating blade carrier and one of the standards, the blade carrier in this figure being of the cross-sectional configuration which I use for cultivation only.

Fig. 5 is a perspective view of a portion of my cultivating blade.

In the drawings like characters of reference indicate corresponding parts in the different figures.

Essentially my invention consists of a chassis or framework A mounted upon a pair of ground engaging wheels B, the chassis or framework being adjustable as to height by the means to be more fully described hereinafter. At the rear end of the framework I provide a pair of standards C, at the lower end of which is mounted a blade carrier D.

The blade carrier D and the standards C, together with the blade E which is secured upon the upper surface of the blade carrier D, constitute the essential features of this invention and will be more fully described as to configuration hereinafter, the essential function of the members C, D and E being however to penetrate the lower ground level to any desired depth and to cut a "furrow slice" at any desired depth below the surface of the land, to sever the roots from the plant of any weed growth by effecting a crushing and cutting action and causing the slice to be lifted over the blade of the blade carrier in a wave like motion which will eradicate and loosen weeds from the surrounding soil, at the same time leaving the stubble trash covering upon the land entirely undisturbed.

I am aware that it is common knowledge to employ a blade positioned transverse to the direction of travel of the implement upon which it is mounted for the purpose of shearing off the plants in a small weed growth and upon uncovered land an inch or so below the surface thereof. Such implements effect more or less of a scuffling or scraping action and differ in all essential considerations from the device described and illustrated herein. It might briefly be stated, however, that such implements were not designed for cultivating land while maintaining a trash covering thereupon nor was the advantage of this method of cultivation contemplated by the inventors of such implements.

Proceeding now to describe my invention as illustrated in the drawings accompanying this specification in detail, my framework A consists of a pair of converging channel members 1, which are joined at their forward ends by means of a fish plate 2 upon which is mounted an angle bracket 3, a coupling or hitch 4, of a very well-known design, being secured upon the underside of the channels 1, at the forward end thereof.

Secured to the rear end of each of the channels 1 is a side member 5, these two members being parallel one with the other and preserved in rigid relationship to the channels 1 by means of fish plates 6. The members 5 are connected by a rear-cross channel 7, the foregoing structure being additionally strengthened by diagonal members 8 and by fish plates 9 and 10.

An angle bar extends across my framework, the ends of this member being secured beneath the fish plates 6, and by reference to Figures 1 and 2 of the drawings accompanying this specification, it will be seen that the upper surface 11 is much narrower than the downturned portion 12 which is of considerable depth but takes the strain imposed by the tie rods 13, these tie rods extending through eyes in the angled bracket 3 and through a pair of eyes provided upon the length of the member 7, the ends of each of the rods being screw threaded.

An angulated axle 15 of the configuration clearly illustrated in the accompanying Figures 1 and 2 extends through the side members 5, being journalled in bearings 16 secured to the webs of the side members 5 and to the webs of the diagonals 8 (see Figure 2). A pair of hydraulic lifts 17 of conventional design and to which I claim no novelty, operate the axle to a limited degree of rotation to lift the chassis A, the connecting rods 18 of said hydraulic lifts bearing upwardly against the projecting plates 19, and being pivoted thereto. The plates 19 are secured to the apex of the brackets 20 which in turn are secured to the front ends of the side members 5, while the connecting rods 21 bear downwardly against the horizontal portions 22 and the arms 23 of the axle 15. The hydraulic lifts are operated by the handle 24 which, it will be seen is connected to a yoke 25 spanning the chassis of my cultivator.

Pivotally secured to the outer surface of each of the side members 5 is my standard C, the configuration of which is clearly illustrated in Figures 1 and 4 of the drawings accompanying this specification and by reference to Fig. 1 it will be seen that I have provided an arcuate slot 26 at the upper rear corner of each of the standards through which extends a bolt provided with a nut 27. The particular setting of the standard C is preserved by the use of a set-screw 28, secured within a bracket 29 mounted upon the inner side of each of the standards C, the upper end of the set-screws bearing against the fish plates 10.

It will be seen that my standards C are of considerable cross-sectional depth from front to rear but are of inconsiderable width from side to side, this structure being resorted to for the purpose of presenting as narrow a surface as possible for a trash covering upon the surface of land being cultivated by this implement. If desired the front edge of the standards may be ground to a knife edge.

Secured to the lower end of each of the standards is my blade carrier D of which I may make use of several designs. Under certain conditions the blade carrier is welded to the support thus eliminating the further obstructions to the flow of soil over the carrier while under other conditions or with certain embodiments, these pieces may be bolted together as hereinafter to be described.

Describing first the blade carrier 30 illustrated in Fig. 4 of the drawings accompanying this specification, this being the type used for cultivation only, the same will be seen to consist of a longitudinal bar slightly curved upon its underside and provided with a curved portion 31 upon the front side of the upper surface upon which the blade E is secured. The rear portion of the upper surface, it will be noted, curves gradually downward towards the back while viewed in plan, the rear edge of the carrier, tapers at the outer end, being of maximum width at the centre portion 32 and at the point where it is secured to the standard C.

My cutting blade E, as illustrated in Figs. 1, 4 and 5 of the drawings accompanying this specification, is of concave cross-sectional configuration curved to a radius of between 9 and 18 inches, and is provided upon its outer edge with a bevelled portion 33 and 34, the bevel being formed upon the concave or upper surface of the blade in these embodiments and not upon the lower. This member is approximately 6 inches in width, although obviously this may be varied within wide limits.

Furthermore, it will be noted that the degree of curvature in the blade in these embodiments is somewhat less than the curvature of the portion 31 of the blade carrier, so that the blade bears against the shoulder of the portion 31 rather than upon the whole surface thereof. Blades of varying degrees of curvature may be used upon the same carrier and while there is no objection to the curvature of a blade corresponding to the curvature of the portion 31, it will be understood that it is undesirable to have the curvature of any blade greater than that of the portion 31, as there would then be a rocking tendency on the part of the blade. I have therefore designed the curvature of the portion 31 as somewhat more than that of any blade which it is practicable to use to prevent this possibility.

I have now described in detail the essential parts of my invention, these being the blade supports or standards C, my blade carrier D and my cutting or furrow slicing blade E.

The blade travels through the soil at any desired depth and lifts it in an easy wave-like motion over the concave surface thereof, back along the bevelled surface 34 and over the curving upper surface of the blade carrier D, in this way cutting off all weed growth and disturbing it sufficiently to effect its decomposition.

While there is a scouring action upon the upper surfaces of the blade, there is none upon the rear surfaces of the blade carrier, from which it will be seen that when properly designed, the lifted furrow slice falls back into place after the carrier has passed beneath it.

Since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:

1. In a cultivating blade and carrier combination, an elongated carrier characterized by having an arched upper surface, said carrier and blade each being divided into two sides by a longitudinal vertical plane extending through each, one side being the advancing side and the other the trailing side, said blade being secured to the upper surface of the advancing side of said carrier at an angle and in overlapping attachment, the advancing side of said blade partially projecting ahead of the front edge of said carrier, part of the trailing side of said blade being tangent to the trailing side of said carrier and projecting above and to the rear of the advancing side of said carrier, so that soil cultivated by said blade tends to be thrown clear of the trailing side of said carrier thereby decreasing frictional resistance.

2. In a cultivating blade and carrier combination, an elongated carrier, said carrier and said blade each being divided into two sides by a longitudinal vertical plane extending through each, one side being the advancing side and the other the trailing side, said blade being concave on the top side and convex on the under side when viewed in transverse cross-section, the upper surface of the advancing side of said carrier being concave, said blade being secured to the concave upper surface of the advancing side of said carrier at an angle and in overlapping attachment, at least the rear portion of the upper surface of the trailing side of said carrier inclining downwardly to facilitate the settlement of a furrow-slice with minimum frictional contact with the upper surface of the trailing part of said carrier.

3. In a cultivating blade and carrier combination, an elongated carrier, said carrier and blade each being divided into two sides by a longitudinal vertical plane extending through each, one side being the advancing side and the other the trailing side, the upper surface of the advancing side of said carrier inclining forwardly and downwardly, said blade being secured to said upper forwardly and downwardly inclining surface in overlapping attachment, at a forward and downward inclination with the advancing part thereof projecting beyond the front edge of said carrier, the trailing part of said carrier extending rearwardly beyond the trailing edge of said blade and inclining rearwardly and downwardly.

4. In a cultivating blade and carrier combination, an elongated carrier, the upper surface of which when viewed in transverse cross-section, is seen to be concave upon the advancing side of the carrier and convex upon the trailing side of the carrier, the concave side being designed to receive elongated cultivating blades of various transverse cross-sectional configurations in overlapping attachment thereto.

5. In a cultivating blade and carrier combination, an elongated carrier, said carrier and blade each being divided into two sides by a longitudinal vertical plane extending through each, one side being the advancing side and the other the trailing side, said blade having an under-surface and a scouring surface and being secured to the upper surface of the advancing side of said carrier at an angle to the ground and in overlapping attachment such that the scouring surface thereof is elevated above the upper surface of the advancing side of said carrier, the advancing side of said blade projecting ahead of the front edge of said carrier.

CHARLES SHERWOOD NOBLE.